United States Patent [19]
Kern et al.

[11] Patent Number: 5,504,417
[45] Date of Patent: Apr. 2, 1996

[54] ENGINE-DRIVEN GENERATOR

[75] Inventors: Robert Kern, Waukesha; Gerald Ruehlow, Oconomowoc; Herb Hoenisch; Mark J. Sarder, both of Waukesha, all of Wis.; Graham W. McLean, Cheshire, Wash.; Michael R. Wheeley, Waukesha, Wis.; Frank Wedel, Lake Mills, Wis.; Mark Kastner, Greenfield, Wis.

[73] Assignee: Generac Corporation, Waukesha, Wis.

[21] Appl. No.: 282,514

[22] Filed: Jul. 27, 1994

Related U.S. Application Data

[63] Continuation-in-part of Ser. No. 897,380, Jun. 11, 1992, Pat. No. 5,376,877.

[51] Int. Cl.⁶ .................................................. H02J 7/14
[52] U.S. Cl. .............................. 322/32; 322/29; 322/14
[58] Field of Search .............................. 322/14, 15, 29, 322/32; 363/160

[56] References Cited

U.S. PATENT DOCUMENTS

| | | | |
|---|---|---|---|
| 4,417,194 | 11/1983 | Curtiss et al. | 322/47 |
| 4,465,920 | 8/1984 | Hoyt, Jr. et al. | 219/133 |
| 5,057,764 | 10/1991 | Fujimoto et al. | 322/14 |
| 5,075,616 | 12/1991 | Mitsui | 322/10 |
| 5,352,971 | 10/1994 | Nishimura | 322/27 |
| 5,373,196 | 12/1994 | Faley | 307/46 |
| 5,376,877 | 12/1994 | Kern et al. | 322/32 |

*Primary Examiner*—Steven L. Stephan
*Assistant Examiner*—Nicholas Ponomarenko
*Attorney, Agent, or Firm*—Reinhart, Boerner, Van Deuren, Norris & Rieselbach

[57] ABSTRACT

An engine-driven generator includes an internal combustion engine, a permanent magnet alternator and an AC to AC converter. The output frequency and voltage of the permanent magnet alternator are largely dependent on engine speed and the alternator load. The AC to AC converter converts the speed-dependent alternating potential developed by the alternator to another alternating potential whose frequency and voltage are largely independent of engine speed. Voltage regulation is provided by varying the engine speed in accordance with the load current. Frequency regulation is provided by frequency dividing the alternator output by an integer divisor that varies in accordance with engine speed. Additional voltage regulation is provided by deleting selected cycles of the alternator output current as needed to maintain the RMS output voltage within predetermined limits. A stepper motor coupled to the throttle of the internal combustion engine controls the speed of the engine in accordance with commands received from an electronic system control.

15 Claims, 13 Drawing Sheets

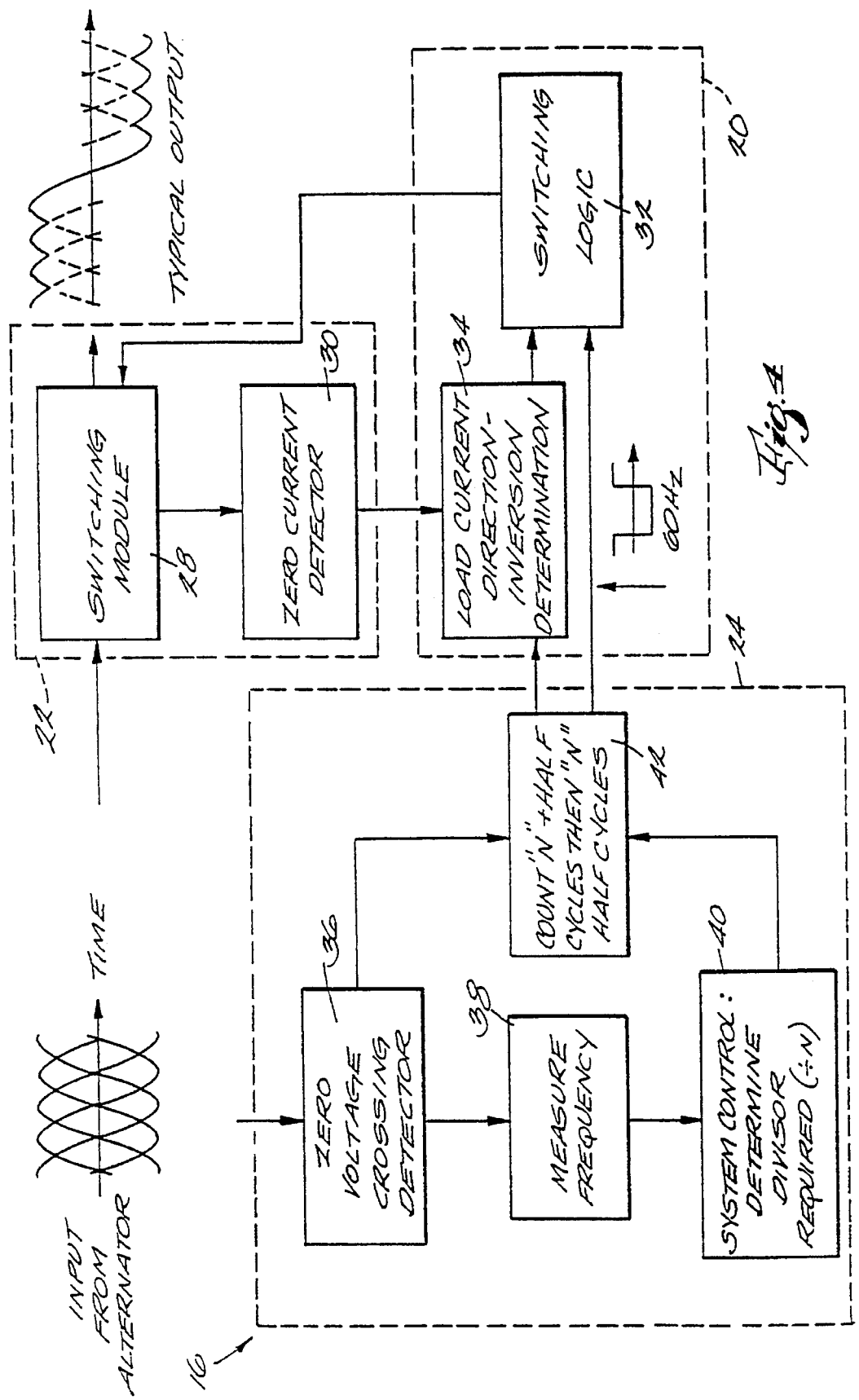

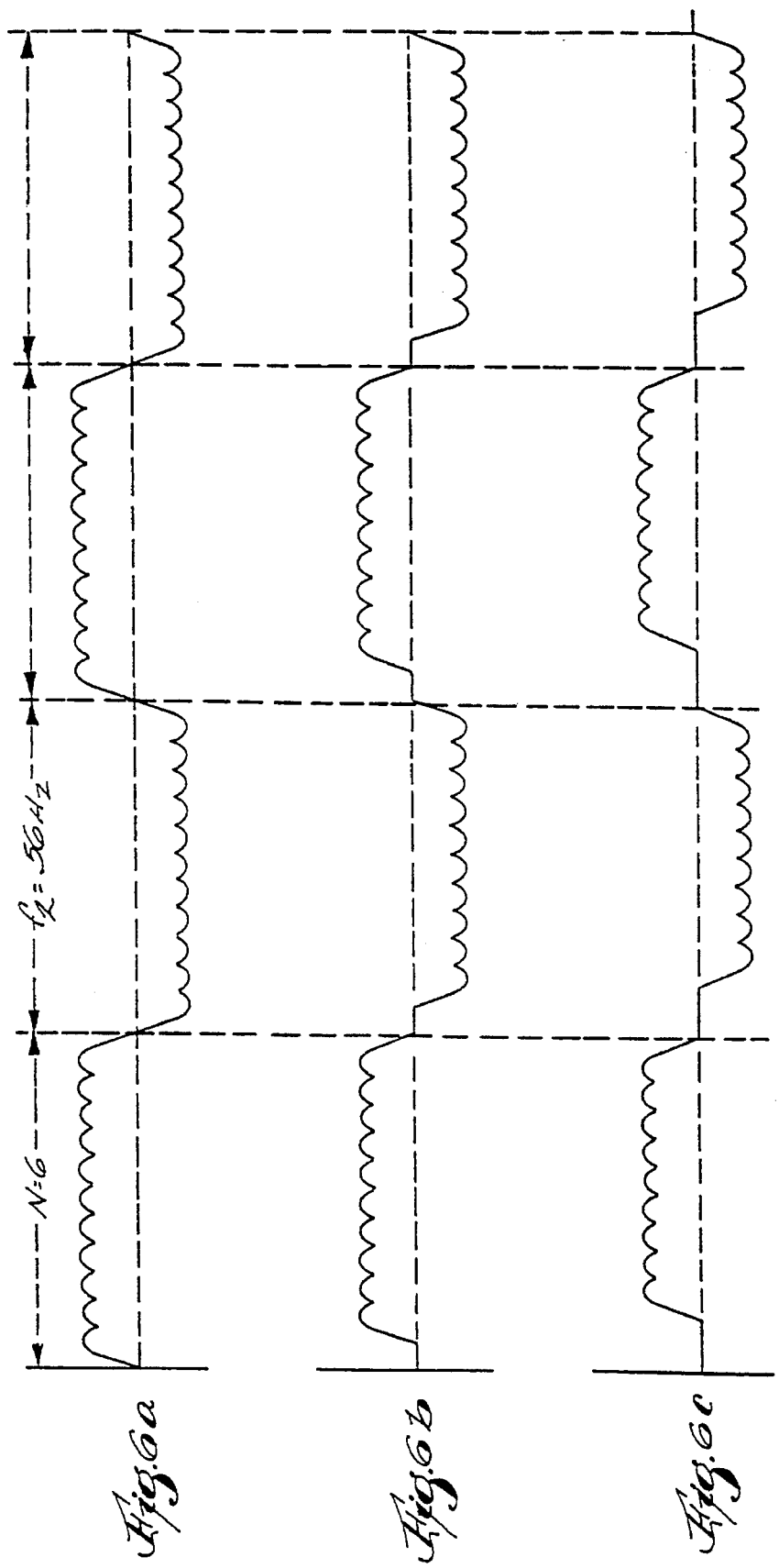

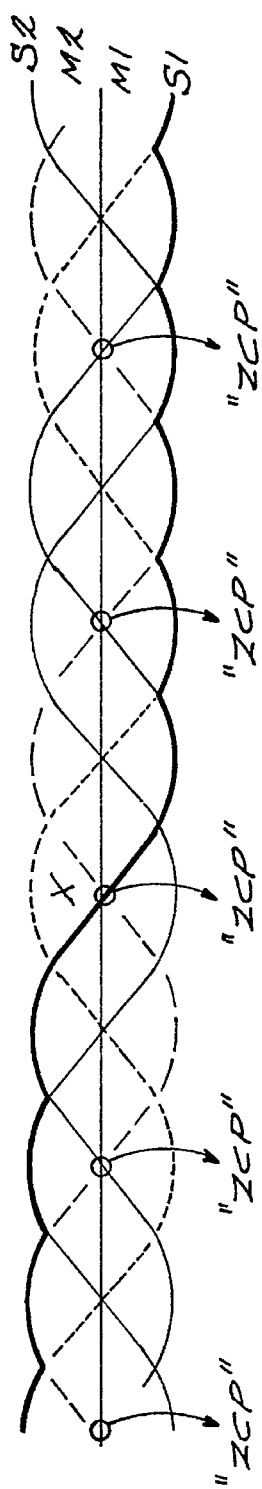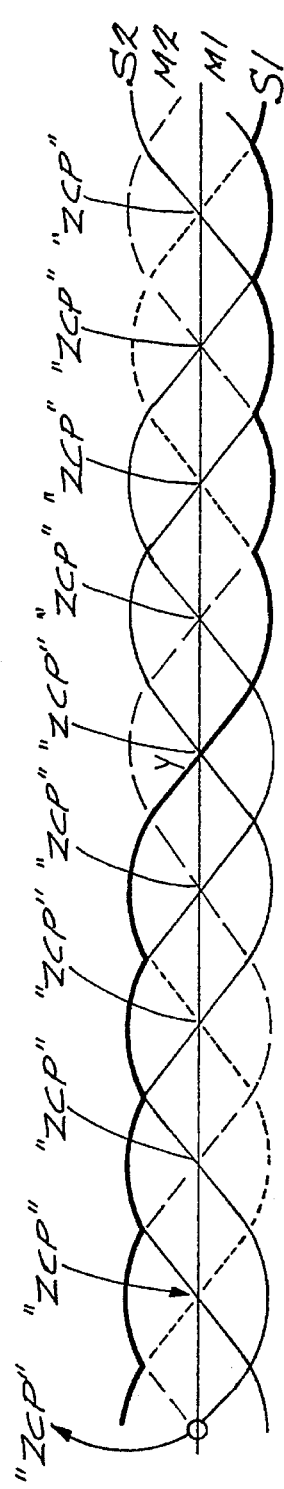

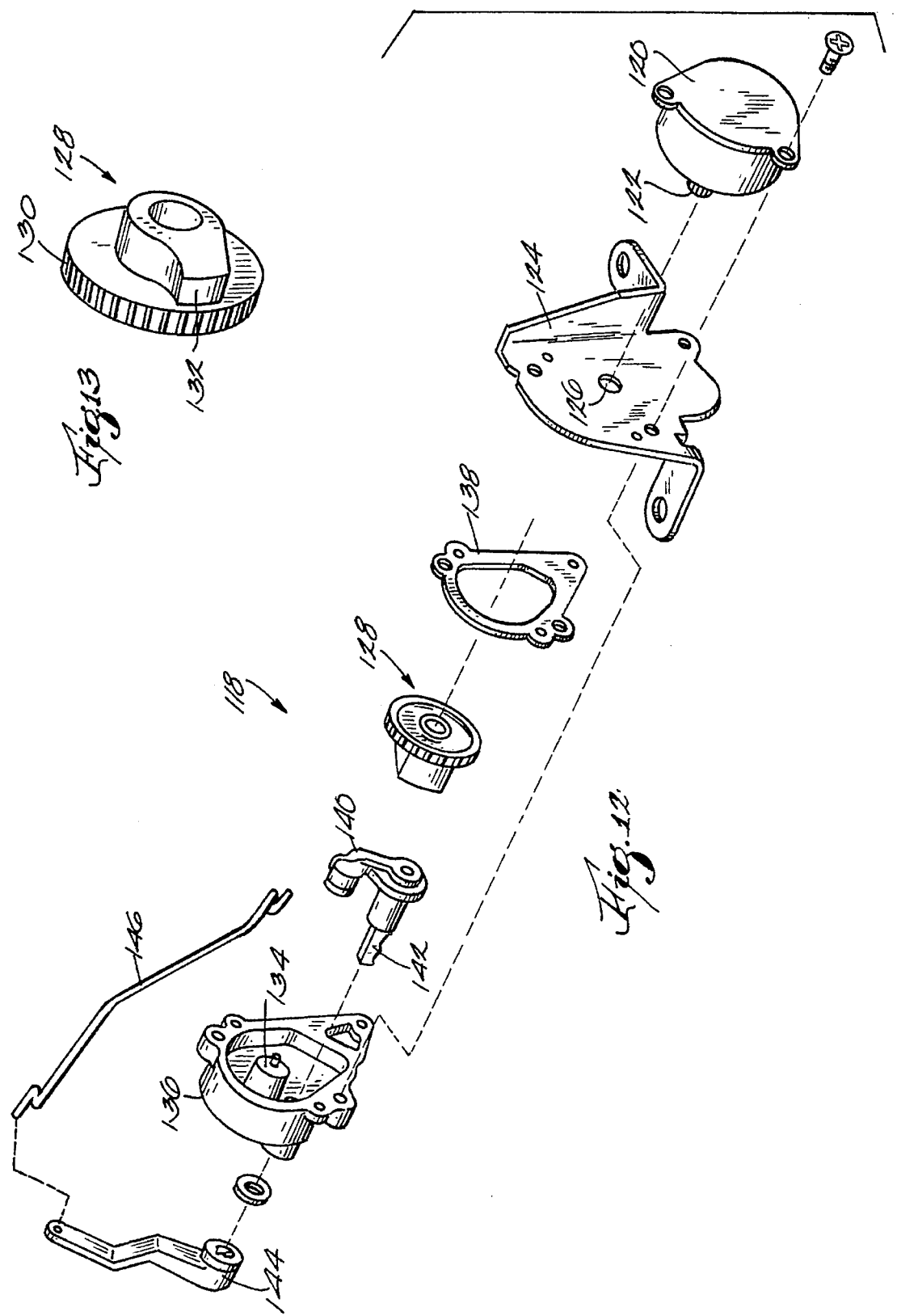

ENGINE-DRIVEN GENERATOR

BACKGROUND OF THE INVENTION

This is a continuation-in-part of U.S. application Ser. No. 07/897,380 filed Jun. 11, 1992, now U.S. Pat. No. 5,376,877.

This invention relates generally to power generating equipment and, more particularly, to engine-driven generators.

Known portable power generators typically include an internal combustion engine coupled to an alternator designed to provide a 120 or 240 volt, 50 or 60 hertz alternating current output. One characteristic of such prior power generators is that, in use, the engine speed is held substantially constant regardless of the actual load. This is necessary because, in such generators, the output frequency is a direct function of engine speed. Running the engine at a constant (usually high) speed results in excessive noise, vibration and fuel consumption, particularly where the load is relatively light and maximum engine power is not required. Alternatively, multiple pole alternators can be used. Such alternators permit the use of lower synchronous engine speeds. However, as engines generally develop peak power at high speeds, considerable engine capacity remains unused if the engine operates only at lower speeds. This is wasteful and makes the generator larger, heavier and more expensive than it needs to be.

Another characteristic of prior power generators (particularly those using permanent magnet alternators) is that the alternators they include are not run at their maximum power output levels. At a given engine speed, such alternators typically provide maximum power when the alternator output voltage drops to about 70% of the no load voltage. Such a voltage drop, however, is unacceptable in practice, and the usual practice is to run alternators at far less than their maximum power output levels. Thus, to achieve a useful output power of, for example, 3.5 KW with a voltage drop of only 5%, the usual practice is to use a permanent magnet alternator capable of developing far more than 3.5 KW. Such an alternator thus has considerable excess capacity that is never utilized, and is physically larger, heavier and more expensive than an alternator having a true maximum power capability of 3.5 KW. The challenge, therefore, is to operate an alternator at up to its peak power capability while still keeping the output frequency and voltage within acceptable limits.

To improve efficiency and reduce size and weight, some prior generators have combined high frequency multiphase alternators with electrical circuitry for converting the high frequency multiphase alternating current to a 50 Hz or 60 Hz single-phase current independent of engine speed. Such a system is shown, for example, in U.S. Pat. No. 3,916,284 which issued Oct. 28, 1975 to Walter P. Hilgendorf. In the Hilgendorf system, voltage regulation is provided by varying the current through the pole field winding of an alternator having a polyphase armature winding and a self-excited field winding. Accordingly, the Hilgendorf system is not readily adapted for use in permanent magnet alternators having a fixed stator and a permanent magnet rotor arranged to rotate around the stator. Because permanent magnet alternators provide many advantages over self-excited alternators, this shortcoming of the Hilgendorf system is significant.

Still further improvement and economy in engine-driven generators can be realized by considering the engine used to turn the alternator. Two important characteristics of an engine-driven generator are engine size and weight. The versatility, and hence the overall value, of a portable power generator is improved by reducing its size and weight. Because the engine makes up a significant portion of the overall size and weight of the generator, significant improvement can be realized by reducing the size and weight of the engine.

Another important aspect of engine-driven generator design is speed control. In prior generators, wherein the engine ran at a fixed constant speed in order to provide a fixed output frequency, precise speed control, except at the desired constant speed, was relatively unimportant. In more recent designs, the output frequency is independent of engine speed, and engine speed is determined by an electronic control. This requires that precise speed control be available over the entire range of engine speeds. In the past, it has been difficult to achieve precise speed control at low speeds where a small change in throttle position results in a large change in engine speed.

Still another aspect of generator design is economy. As noted, the engine makes up a significant portion of a portable power generator and reflects a significant portion of its overall cost. Engines that can be economically manufactured and operated are favored.

In view of the foregoing, it is a general object of the present invention to provide a new and improved engine-driven portable generator.

It is a further object of the present invention to provide a new and improved engine-driven portable generator that is economical, lightweight, efficient and quiet.

It is a further object of the present invention to provide a new and improved engine-driven portable generator that enables a permanent magnet alternator to be operated up to its maximum power output, while still providing acceptable frequency and voltage regulation.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 4 is a functional block diagram of an AC to AC converter incorporated in the engine-driven generator embodying various features of the invention.

FIGS. 6A–6C are waveform diagram showing various waveforms useful in understanding the method for providing over-voltage protection in the engine-driven generator.

FIG. 8 is a waveform diagram useful in understanding one method of controlling the zero crossing timing of the generator output.

FIG. 9 is a waveform diagram useful in understanding another method of controlling the zero crossing timing of the generator output.

FIG. 12 is an exploded perspective view of a stepper motor throttle actuator assembly included in the internal combustion engine shown in FIG. 11.

FIG. 13 is a perspective view of a cam included in the stepper motor throttle actuator assembly shown in FIG. 12.

DESCRIPTION OF THE PREFERRED EMBODIMENT

Figure 1:
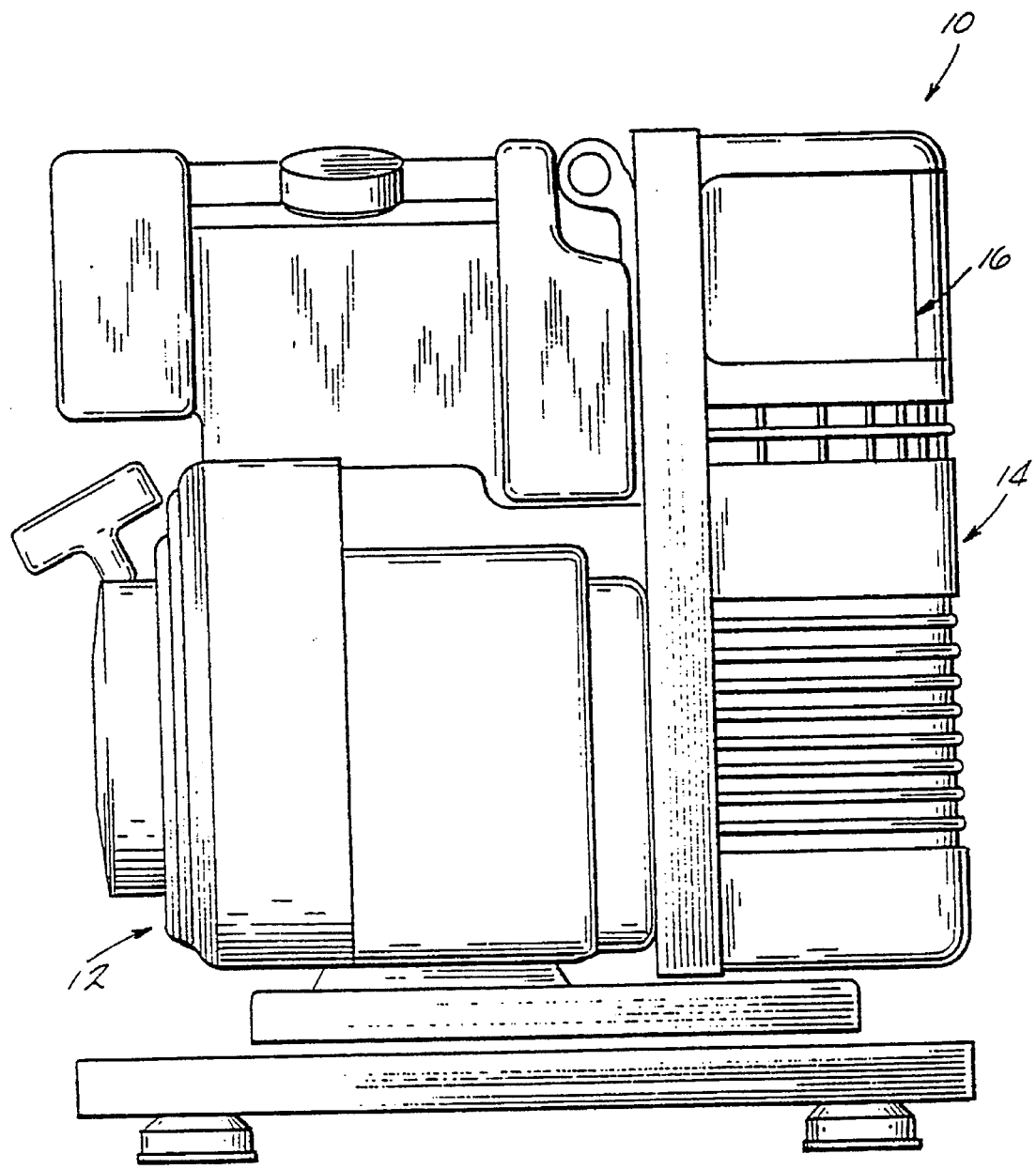
FIG. 1 is side elevation view of an engine-driven generator constructed in accordance with various aspects of the invention.

Referring to the drawings, a portable power generator 10 embodying various features of the invention is shown in FIG. 1. The power generator 10 generally includes an internal combustion engine 12 coupled to a permanent magnet alternator 14. The engine 12 and alternator 14 are preferably of the type shown and described in the copending applications of Kern., et al., Ser. Nos. 07/897,369 and 07/897,329, entitled, respectively, "Internal Combustion Engine for Portable Power Generating Equipment" and "Permanent Magnet Alternator," the specifications of which are incorporated by reference herein.

In operation, the engine 12 turns the permanent magnet alternator 14 to develop a first alternating potential (also referred to herein as the "alternator output"). The frequency, as well as the no-load voltage of the first alternating potential is directly related to the engine speed, i.e., the frequency and no-load voltage both increase as engine speed increases. The power generator 10, in accordance with one aspect of the invention, further includes a control and regulator circuit 16 that converts the first alternating potential developed by the alternator into a second, lower frequency, alternating potential (e.g., 60 Hz 120 VAC) useful for powering various electrical devices. (The second alternating potential is also referred to herein as the "Generator Output.")

In accordance with one aspect of the invention, and in contrast to prior devices, the internal combustion engine 12 in the power generator 10 does not operate at a fixed, constant speed, but, rather, operates at a speed that varies in accordance with the load magnitude. In other words, at low loads, where relatively little current is required from the power generator 10, the engine speed is relatively low. At higher loads, where greater current is drawn from the generator 10, the engine speed is higher. In all cases, the frequency and voltage of the alternating output produced by the generator 10 remain relatively constant and substantially within pre-established upper and lower limits (e.g., 56–60 Hz, and 108–127 $V_{rms}$). This remains true even though the frequency and voltage of the alternator output change greatly with changing engine speed. Such voltage and frequency regulation is accomplished by the control and regulator circuit 16 which controls engine speed and converts the alternator current into the generator output current.

Figure 2:
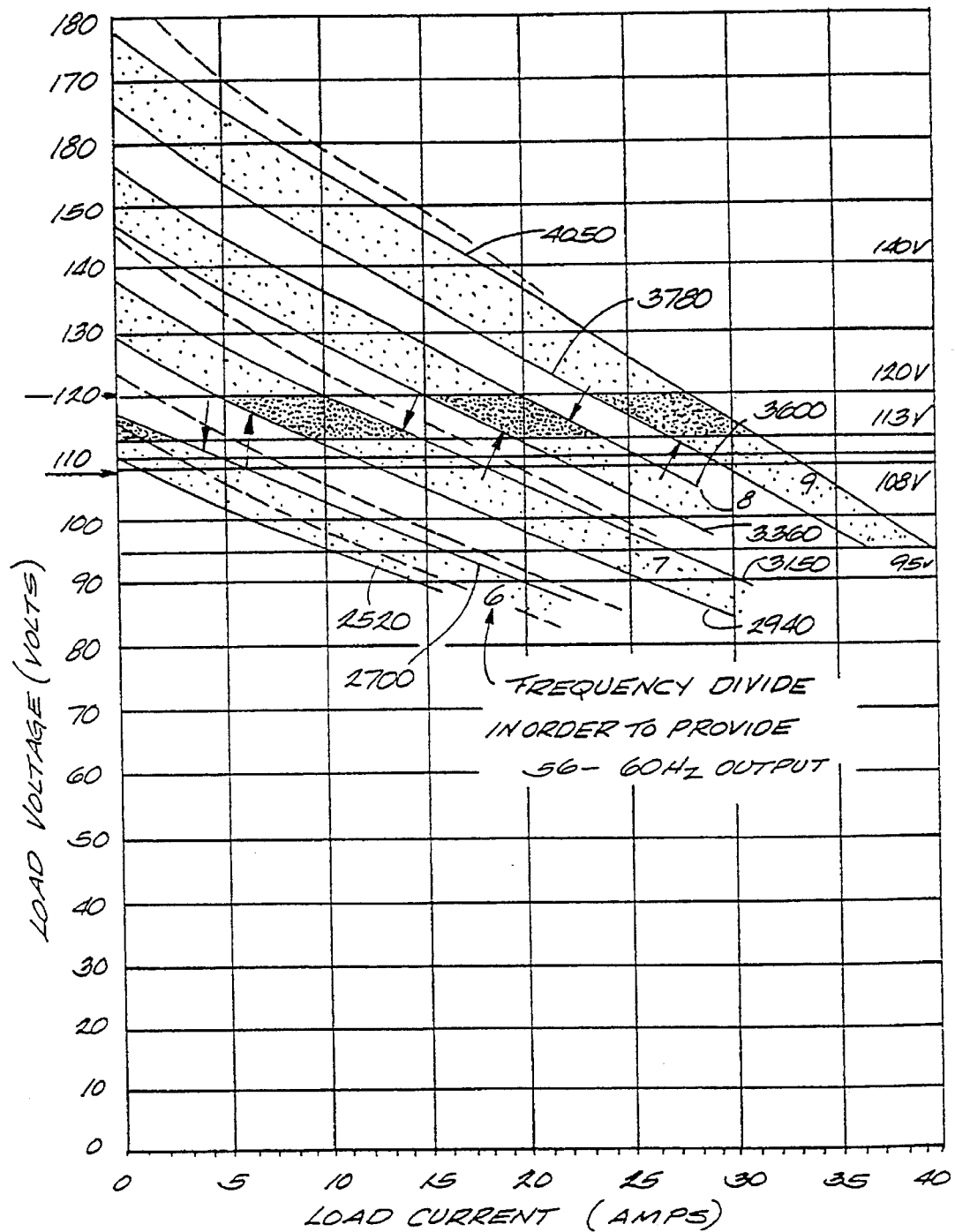
FIG. 2 is a graph showing unregulated alternator output voltage as a function of load current at various engine speeds.

The general function of the control and regulator circuit 16 can best be understood by reference to FIG. 2, which shows the relationship between the alternator output voltage versus alternator load current at various engine speeds. One characteristic of the permanent magnet alternator 14 is that the alternator output frequency and voltage are direct functions of engine speed. Another characteristic is that, at a given engine speed, the output or load voltage drops with increasing load current. For example, at an engine speed of 2520 rpm, the alternator output voltage drops from a maximum alternator output voltage of 110 $V_{rms}$ (no-load) to 90 $V_{rms}$ when the load current is 15 amperes. At an engine speed of 2700 rpm, the alternator voltage drops from 118 $V_{rms}$ (no - load) to 90 $V_{rms}$ at 20 amperes. Similar relationships are exhibited at all engine speeds. In all cases, the maximum (no-load) voltage increases with increasing engine speed and the maximum load current obtainable at any useable voltage also increases with increasing engine speed. Maximum output power at any given engine speed is obtained from the alternator 14 when the load current is such that the alternator output voltage drops to about 70% of its no-load value.

For the typical permanent magnet alternator 14 whose output characteristics are shown in FIG. 2, the alternator output frequency is a direct function of engine speed. In this example, the alternator includes four windings displaced at 90° intervals relative to each other, and the output frequency (in Hertz) is equal to eight times the engine speed in revolutions per second. Thus, the alternator output frequency varies from 336 Hz. at an engine speed of 2520 rpm, to 540 Hz. at an engine speed of 4050 rpm. The generator output frequency is lower than the alternator output frequency and is derived by frequency dividing the A–C alternator output by a whole number or integer divisor.

Because the A–C power requirements for most electrical devices, motors and machines call for a more or less fixed frequency and voltage, (e.g., 120 V, 60 Hz.) the alternator output is not directly usable without further voltage and frequency conversion and regulation. For example, if it is desired that the generator output voltage be kept between 108 and 120 $V_{rms}$ at any load current between 0 and 34 amperes, FIG. 2 shows that such an output can be obtained provided that the engine 12 is operated within predetermined upper and lower speed ranges or bands that depend on the load current. For example, if the load current is 10 amperes, the desired generator output can be kept within the voltage limits by operating the engine 12 between approximately 2940 rpm and 3150 rpm. If, in addition, it is desired to maintain the output frequency between, for example, 56 Hz. and 60 Hz., and it is further desired that the generator output frequency is obtained by frequency dividing the alternator output by a whole number integer, FIG. 2 shows that this requirement also imposes limits on the available engine operating speeds. For example, if the generator output current is derived by frequency dividing the alternator output current by the integer 6, the requirement that the output frequency remain between 56 Hz. and 60 Hz. requires that the engine be operated between the speeds of 2520 rpm and 2700 rpm. Similarly, if the divisor is the integer 7, the engine must operate between the speeds of 2940 rpm and 3150 rpm. Still higher engine speeds can be used by using the integers 8 and 9 as divisors.

The generator output can be kept within the desired upper and lower current and frequency limits by operating the power generator 10 within the engine speed, load current and frequency divisor specifications shown in the dark shaded regions of FIG. 2. For example, the desired voltage and frequency characteristics can be obtained at load currents up to six amperes by using an engine speed up to 2700 rpm and a frequency divisor of 6. If additional current is desired, the engine speed must be increased above 2700 rpm in order to keep the load voltage above 108 $V_{rms}$. Increasing the engine speed above 2700 rpm while using a frequency divisor of 6 would, however, increase the output frequency above 60 Hz. and thus place the generator output frequency outside the desired range. However, if the frequency divisor is increased to 7, and the engine speed is increased to 2940 rpm, the desired load current can be obtained while maintaining the generator output voltage and frequency within the desired limits. Similarly, for load currents greater than approximately 17 amperes (and in the example shown), it is necessary to raise the engine speed to at least 3360 rpm and use a frequency divisor of 8. This provides the desired frequency and voltage specifications up to approximately 27 amperes. Above 27 amperes, the engine speed must be increased to at least 3780 rpm and the frequency divisor increased to 9.

By controlling the engine speed and the frequency divisor in this manner, the control and regulator circuit 16 of the power generator 10 allows a single permanent magnet alternator 14 to provide up to its maximum available power at any given engine speed while still maintaining the output voltage within tolerable limits.

Figure 3:
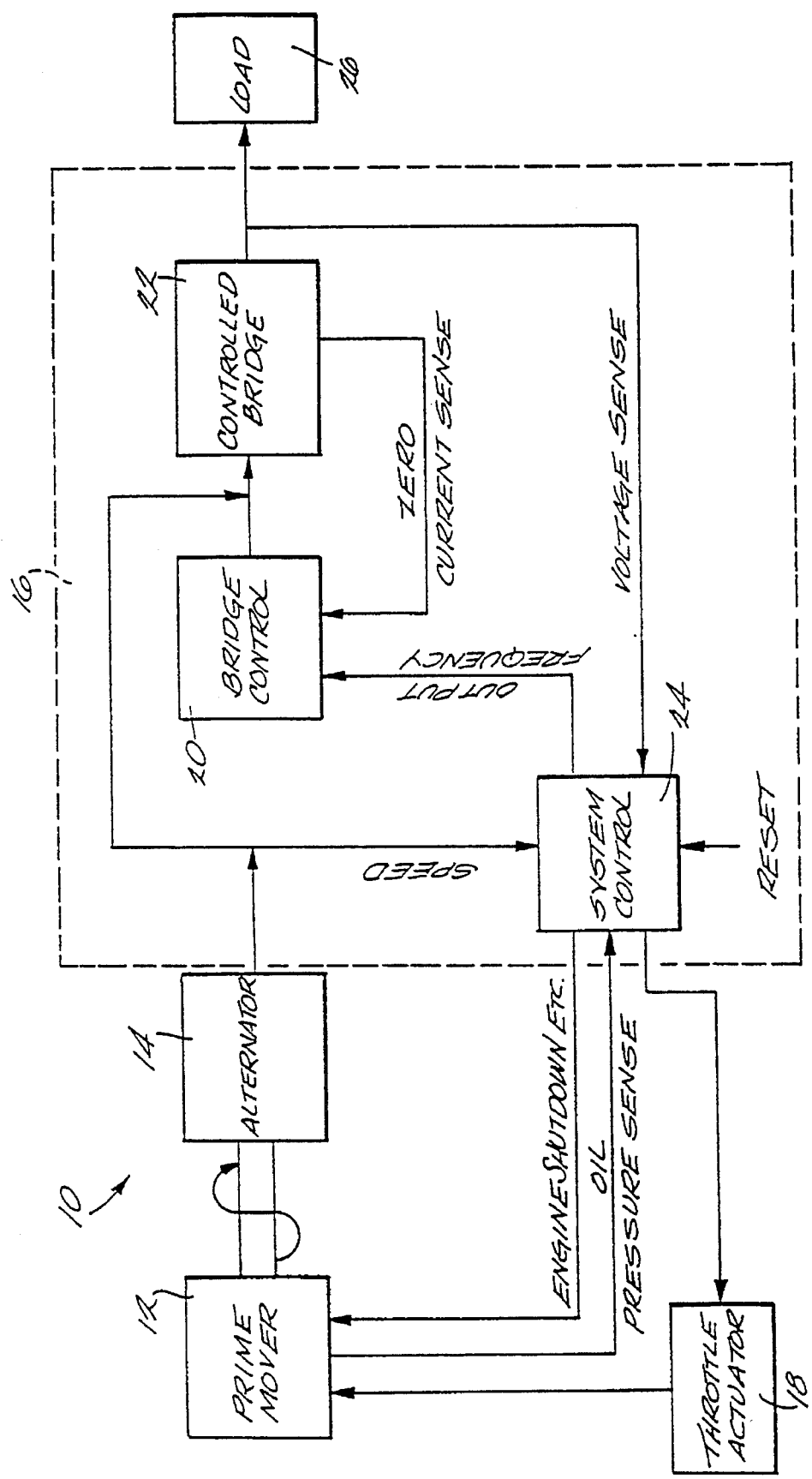
FIG. 3 is a simplified functional block diagram of the engine-driven generator constructed in accordance with various aspects of the invention.

A system for implementing the scheme described above is shown in FIGS. 3 and 4. As illustrated in FIG. 3, the generator 10 includes, in addition to the internal combustion engine (prime mover) 12 and alternator 14, a throttle actuator 18, a bridge control 20, a controlled bridge 22 and a system control circuit 24. The throttle actuator 18 is coupled to the internal combustion engine 12 and increases or decreases the engine speed in accordance with electronic control instructions received from the system control 24. The system control 24 also receives inputs indicative of the engine operating conditions and provides additional control commands (e.g., an engine shutdown command in the event oil pressure is lost) to the engine 12.

The output of the alternator 14 is applied to the controlled bridge 22 which, in known manner, converts the alternator output current to a continuous series of pulses wherein each of the pulses comprises substantially one half-cycle of the alternator output current. The direction of the unidirectional pulses can be controllably reversed to provide either positive going or negative going pulses at the output of the controlled bridge. These pulses are available for application to a load 26.

The polarity of the unidirectional pulses provided at the output of the controlled bridge 22 is controlled by the bridge control 20 which, in turn, is controlled by the system control 24. Fundamentally, the bridge control 20, under the direction of the system control 24, periodically reverses the direction of the pulses from the controlled bridge 22 so that the output of the controlled bridge 22 consists of alternating sequences of positive and negative going pulses. The transition from positive going pulses to negative going pulses and back again takes place at a cyclical rate substantially equal to the desired output frequency of the generator 10 (e.g., 56–60 Hz.)

The system control 24 monitors the frequency of the alternator output (which is also indicative of engine speed) as well as the output voltage of the controlled bridge 22. In this manner, the system control 24 simultaneously monitors the output frequency and output or load voltage provided by the generator 10.

The control and regulator circuit 16 is shown in greater detail in the system block diagram of FIG. 4. As illustrated, the controlled bridge 22 includes a switching module 28. The input to the switching module 28 consists of the output of the alternator 14 (FIG. 3), which, in practice, can be a single or multiple phase alternating voltage. The switching module 28 includes a plurality of electronic power switch devices that can be controllably switched to provide, at their outputs, either positive or negative going pulses. The controlled bridge 22 further includes a zero current detector 30 that detects when the zero current or "cross over" point occurs as the direction of the output current is reversed.

The bridge control 20 includes switching logic 32 for controlling which ones of the individual switch devices are actuated as necessary to achieve the desired voltage output. The bridge control 20 further includes a load current direction determination circuit 34 that responds to the zero current points detected by the zero current detector 30 to determine whether the load voltage and current have opposite polarity and whether triac inversion is required.

The system control 24 includes a zero voltage crossing detector 36 that detects the zero voltage cross-over points of the alternator output potential. This enables the system control 24 to count the individual half cycles of the alternator potential. The system control 24 further includes frequency measuring logic 38 that measures the period of these cross over points.

After measuring the frequency of the alternator voltage, the system control 24 next calculates (reference numeral 40) by what integer the alternator output frequency must be divided in order to produce an alternating current within the desired frequency range, e.g., 56–60 Hz. The number or divisor N thus calculated is loaded into a counter circuit 42 that, in response to the signal developed by the zero voltage crossing detector 36, counts the requisite number N of half cycles of the alternator output current. Upon reaching the required count, the counter 42 then signals the triac switching logic 32 of the bridge control 20 to reverse the voltage provided at the output of the controlled bridge 22. Additionally, the counter 42 signals the load current direction/ inversion determination circuit 34 which signals the triac switching logic 32 to cause triac inversion.

Figure 5A:
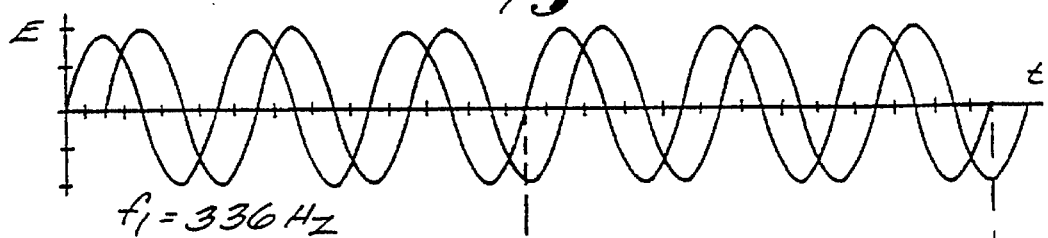
FIGS. 5A–5E are various waveform diagrams useful in understanding the method for providing frequency regulation in the engine-driven generator.
Figure 5B:
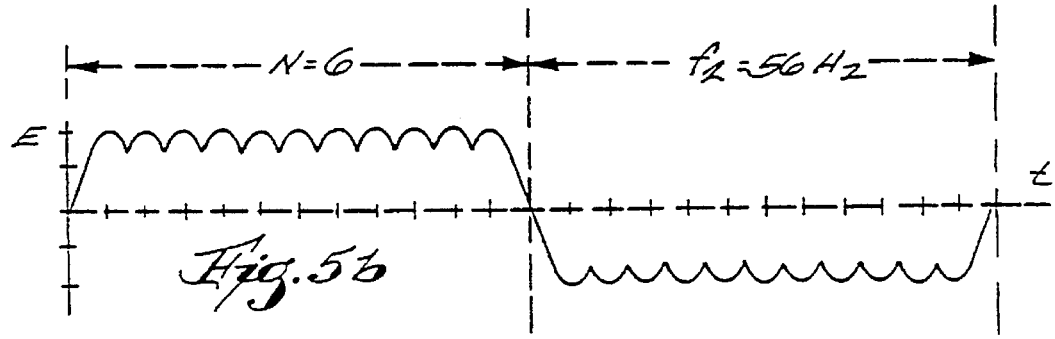

The operation of the system can best be understood by reference to the waveform diagrams of FIGS. 5(a)–5(e). In FIG. 5, an alternator 14 providing a two phase output is utilized. The two-phase alternator output voltage is illustrated in FIG. 5(a). Because of the arrangement of switching devices in the controlled bridge 22, the negative voltages of these waveforms are available for switching to the output. The output of the controlled bridge 22 is shown in FIG. 5(b). As shown, the output of the controlled bridge 22 consists of a predetermined number of positive-polarity half-cycles of the alternator voltage, followed by an equal number of negative-polarity half-cycles of the alternator voltage. This sequence is repeated over and over, and the repetition rate constitutes the output frequency of the generator.

In the example illustrated in FIGS. 5(a) and 5(b), the engine 12 is operating at 2520 rpm thereby giving the alternator output a frequency of 336 Hz. The system control 24 specifies a divisor of N=6 which places the output frequency of the generator 10 at 56 Hz. As shown in FIG. 5(b) each half-cycle of the generator output includes six half-cycles of the alternator output.

Figure 5C:
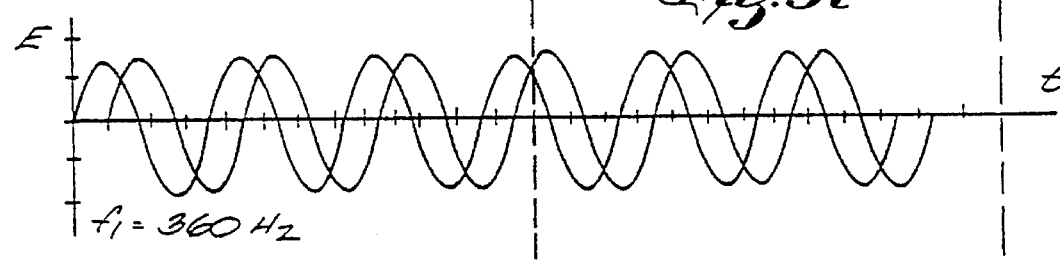
Figure 5D:
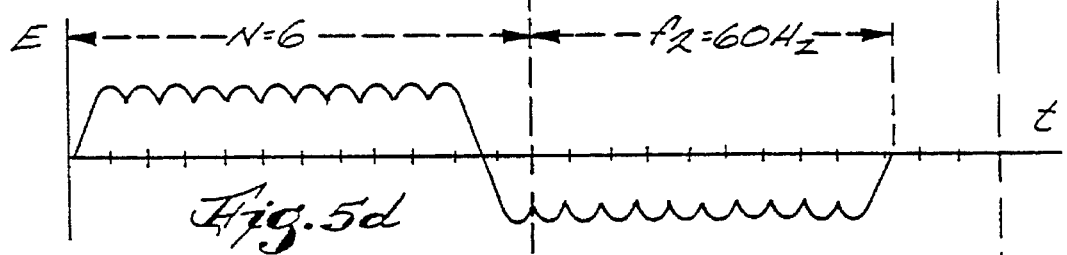

In FIGS. 5(c) and 5(d) the engine speed has increased to 2700 rpm thereby placing the alternator output frequency at 360 Hz. The divisor N remains at 6 and the same number of alternator output half-cycles remain in each half-cycle of the generator output. However, because of the reduced period (increased frequency) of the alternator output, the generator output frequency has now increased to 60 Hz.

Figure 5E:
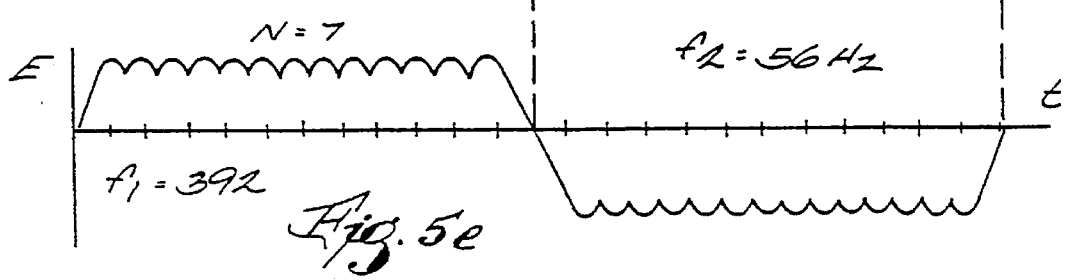

In FIG. 5(e) the engine speed is now 2940 rpm and the alternator output frequency in 392 Hz. If the divisor remained at N=6, the generator output frequency would be 65.3 Hz., a frequency outside of the predetermined frequency range. Accordingly, the system control 24 selects 7 as the divisor N. This places seven half-cycles of alternator output in each half-cycle of generator output thereby giving a generator output frequency of 56 Hz. A divisor of N=7 is useful up until the engine speed reaches 3150 rpm at which point the alternator frequency is 420 Hz. and the generator output frequency is 60 Hz. Above 3150 rpm, a divisor of N=7 cannot be used as this would place the generator output frequency above 60 Hz.

It should be noted that, when the next divisor (i.e., N=8) is selected, the minimum permissible engine speed is 3360 rpm (alternator frequency of 448 Hz.) as any lower engine speed would then place the generator frequency below the low frequency limit of 56 Hz. Accordingly, certain engine speed ranges, i.e., 2700–2940 rpm, 3150–3360 rpm and 3600–3780 rpm in the particular embodiment shown and described, are unwanted regardless of the load current and regardless of the particular divisor in use at any time.

Due to the rotational inertia of the internal combustion engine 12 and the alternator 14, it is not possible to change, instantaneously, the engine speed to match instantaneous changes in the load current. To minimize the possibility of potentially damaging overvoltage conditions that might result when the engine 12 is operating at a high speed and a heavy current load is switched off, means are included for providing a substantially constant RMS voltage at the generator output. In the illustrated embodiment, such protection is provided by eliminating selected ones of the alternator current half-cycles from the generator output current when the alternator output voltage rises above predetenrdned limits. This function is illustrated in FIGS. 6(a) through 6(c).

In FIG. 6(a), the alternator voltage is within acceptable limits and each one of the half-cycles determined by the divisor N is included in the generator output.

In FIG. 6(b) the alternator output voltage has increased to the point that the generator output RMS voltage would exceed the upper voltage limit. To prevent this, the system eliminates one pulse from the positive and negative going half-cycles of the generator output. The period (and hence the frequency) of the generator output, however, remains unchanged. In this manner, the generator output frequency remains fixed while the RMS output voltage of the generator 10 is rapidly reduced.

In FIG. 6(c) the alternator output voltage has risen to a point that it is necessary to delete two pulses from the generator output to maintain the RMS generator output voltage within limits. Once again, the output frequency of the generator 10 is unchanged.

The deletion of certain cycles of the alternator output from the generator output can be implemented through suitable control of the switch devices in the controlled bridge 22.

It is important to note that the above-described voltage regulation is intended to function as a substantially instantaneous voltage control to prevent overvoltage conditions while the engine speed is being reduced. It will be appreciated that normal voltage regulation is provided by controlling the engine speed and that, after the engine speed has been sufficiently reduced, it is no longer necessary to eliminate selected cycles of the alternator output from the generator output. Alternatively, a phase-angle technique can be used.

Figure 7:
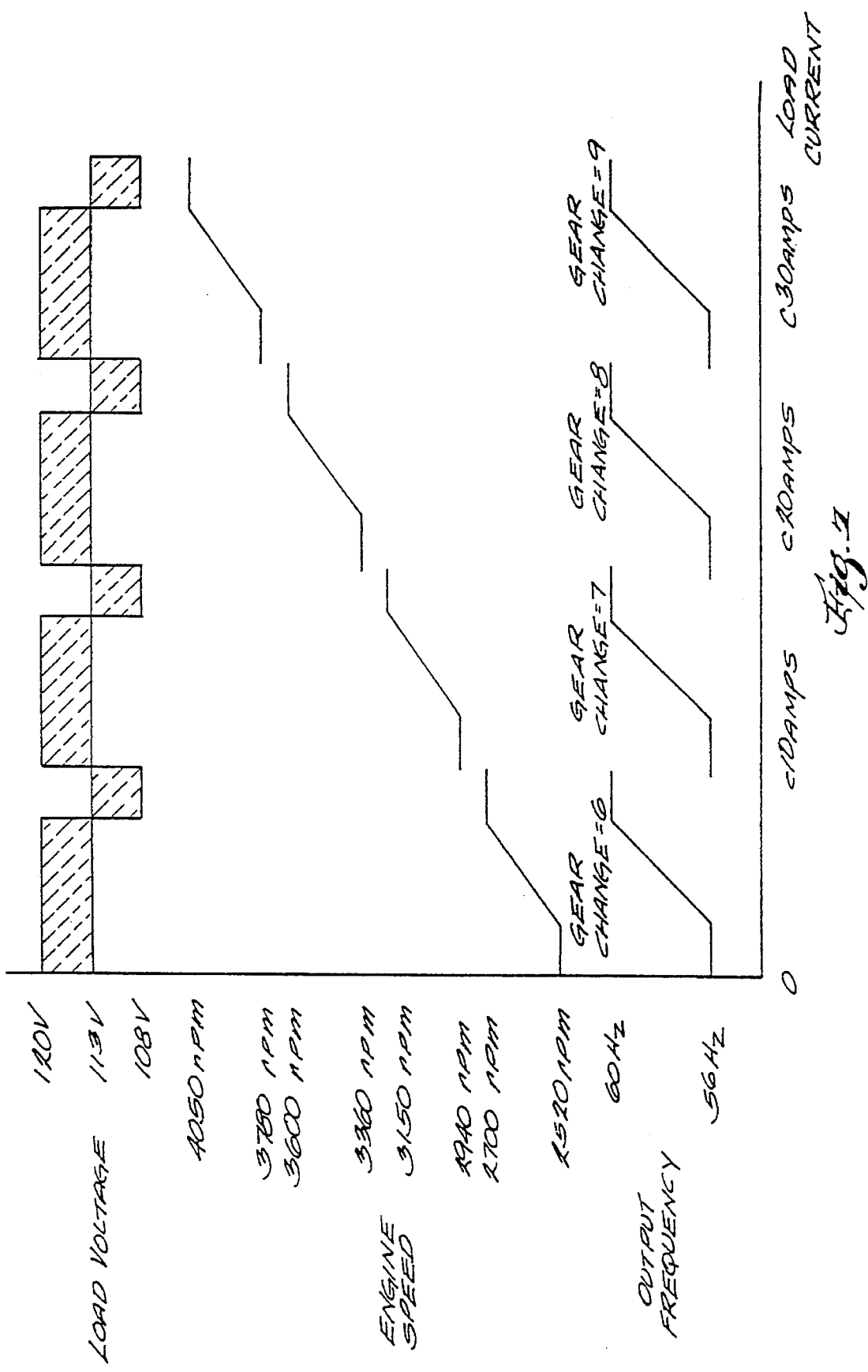
FIG. 7 is a graph showing output voltage, engine speed and output frequency versus load current for one embodiment of the engine-driven generator, useful in understanding the operation thereof.

The overall operation of one representative example of an engine-driven generator 10 constructed in accordance with the invention is shown in FIG. 7. This generator 10 is intended to provide up to 3.5 kilowatts while maintaining an RMS output voltage between 108 and 120 volts and an output frequency between 56 and 60 Hz. Such a generator incorporates a sixteen pole, two phase permanent magnet alternator 14 that provides eight cycles of alternating current in each phase per revolution of the alternator rotor.

At load currents below eight amperes, the engine operates at 2520 rpm and the divisor N is 6. With an engine speed of 2520 rpm, the output frequency is 56 Hz. As the output current rises, the engine speed increases to 2700 rpm while the frequency increases from 56 Hz. to 60 Hz. The load voltage varies from a high of 120 volts (no-load) to a low of 108 volts when the load current reaches eight amperes.

At load currents between eight and ten amperes, the divisor N is increased to 7 and the engine speed is increased to 2940 rpm thereby placing the output frequency at 56 Hz. Between eight and ten amperes, the divisor N remains at 7 and the engine speed and the output frequency remain constant.

Between ten and fourteen amperes, the engine speed increases between 2940 rpm and 3150 rpm with increasing load current. This, of course, simultaneously increases the output frequency from 56 Hz. to 60 Hz. By so increasing the engine speed, the load voltage can be maintained within a preferred range of between 113 volts and 120 volts without approaching the low voltage limit of 108 volts. Once the engine speed reaches 3150 rpm, however, any further increase would place the output frequency above 60 Hz. Accordingly, with load currents between fourteen and sixteen amperes, the engine speed is maintained constant at 3150 rpm and the output voltage decreases with decreasing load current until the output voltage reaches 108 volts.

Once the load current reaches sixteen amperes, the divisor (N) is incremented to N=8 and the engine speed is increased to 3360 rpm, giving an output frequency of 56 Hz. This engine speed is maintained until the load current reaches twenty amperes at which time the engine speed is increased as was the case between load currents of ten and fourteen amperes. Above approximately twenty-two amperes, the engine speed is maintained at 3600 rpm (output frequency of 60 Hz.) until the load voltage drops to 108 volts at approximately twenty four amperes.

Above twenty four amperes, the divisor N is increased to N=9 and engine speed varies between 3780 rpm and 4050 rpm.

During large changes in load current, the engine speed can vary over a wide range. At the same time, it is possible for the output frequency to fall outside the preferred range. It will be apparent to those skilled in the art that, by appropriately timing the change in the divisor N it is possible (and preferred) to keep the output frequency at or below 60 Hz.

As previously noted, certain engine speed ranges or bands are unavailable or prohibited if the generator output frequency and voltage are to remain within pre-established limits. To minimize or eliminate the existence of such unavailable speed ranges, the divisor N can, in one alternative embodiment of the invention, assume half integer as well as integer values. For example, divisors of N=5.5, N=6.5, N=7.5 and N=8.5 can be used. When such half integer divisors are available, the bands of unavailable engine speeds are reduced or eliminated. For example, and assuming once again that the generator output frequency must be maintained between 56 Hertz and 60 Hertz, and that the alternator output frequency (in Hertz) is equal to eight times the engine speed in revolutions per second, the impermissible engine speeds are 2,475 to 2,520 rpm, 2,700 to 2,730 rpm, and 2,925 to 2,940 rpm. This is in contrast to the earlier described embodiment wherein only integer divisors were available and wherein much larger impermissible speed bands (2,700 to 2,940 rpm, 3,150 to 3,360 rpm and 3,600 to 3,780 rpm) existed. By widening the frequency band just a little more, all impermissible engine speeds are eliminated.

Frequency division by half integer divisors is implemented by allowing any one of the four available phases appearing at the output of the alternator to serve as a source voltage for the zero voltage crossing detector. With all phases thus available for this purpose, the effective number of zero voltage crossing points occurring during each rotation of the alternator is effectively doubled. Thus it is possible for either of the windings to conduct through into the opposite polarity. FIG. 8 shows the zero voltage crossing points "ZCP") that are available when only one of the alternator windings is coupled to the zero voltage crossing detector. FIG. 9 shows the zero voltage crossing points "ZCP") that are available when both of the alternator windings are coupled to the zero voltage crossing detector. Output voltage polarity change can now take place between the points that would be available when only one winding is coupled to the zero voltage crossing detector. This is illustrated by point Y which is an available switch point in FIG. 9 but not in FIG. 8.

The torque needed to mm the permanent magnet alternator is proportional to rotational speed. Internal combustion engines, however, do not generally develop maximum torque at maximum speed. To help reduce the load on the engine when the engine is called upon to accelerate, selected numbers of pulses are dropped from the generator output voltage. This reduces the torque needed to accelerate the alternator and hence enables the engine to accelerate rapidly to a new, higher speed. The number of pulses eliminated from the output waveform increases with increasing engine speed and, hence, can be based on the magnitude of the divisor N. In the illustrated embodiment, when the divisor changes from 7 to 7.5, one pulse is dropped. When the divisor changes from 7.5 to 8, an additional pulse is dropped. When the divisor changes from 8 to 8.5, still another pulse is dropped. Therefore, when the divisor changes to 8.5, three pulses will be eliminated in each half cycle of the generator output voltage. However, once the engine accelerates to the desired speed, the pulses are no longer eliminated and the full output waveform is generated.

As previously noted, the use of half integer divisors substantially eliminates prohibited engine speed ranges or bands. Accordingly, engine control based on engine speed feedback is no longer necessary. Instead, feedback based on the actual generator output voltage is preferably used.

To implement such a voltage feedback control scheme, a nominal or target output voltage is selected. The actual output voltage is measured and subtracted from the target voltage to develop an error signal. The error signal is then processed by the system control circuitry and an appropriate command is applied to the engine throttle control stepper motor to adjust the engine speed as needed to minimize the error signal. At the same time, the divisor N is changed as needed to keep the output frequency within limits.

Figure 10:
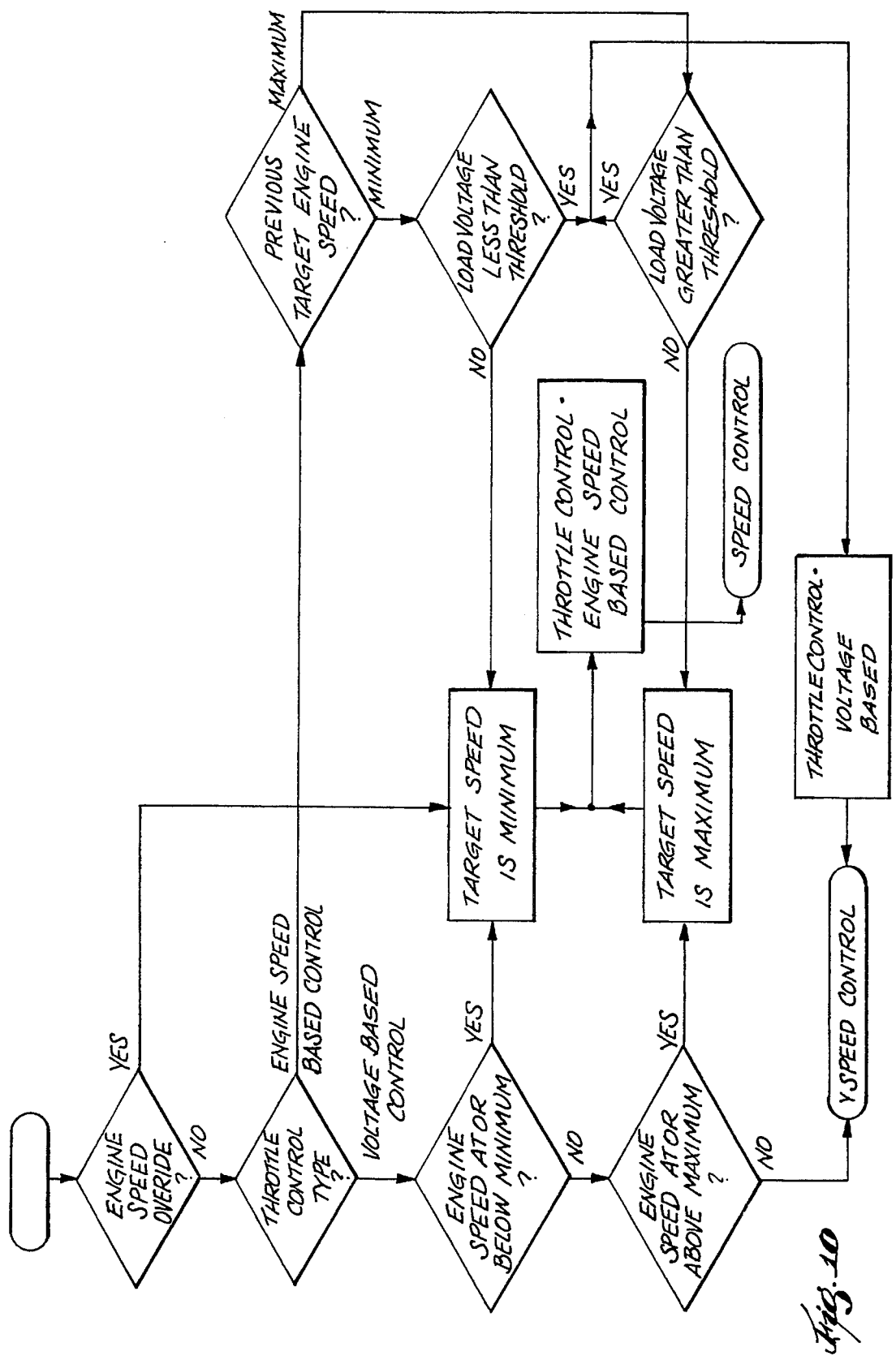
FIG. 10 is a logic flow chart useful in understanding the operation of an electronic control circuit incorporated in the engine-driven generator.

Preferably, two types of engine control are provided. Referring to FIG. 10, under normal operation, engine speed based on voltage feedback is utilized. However, if the engine is accelerated above a predetermined maximum speed (for example, in an attempt to increase the output voltage under load) the control method switches to feedback based on engine speed and holds the engine speed at the predetermined maximum. This method of control is maintained until the load is reduced and the output voltage rises above a predetermined threshold. When this occurs, the system then returns to the voltage feedback method of control. Similarly, if the engine speed drops to a predetermined minimum threshold speed, (for example, under no load conditions) the system maintains the minimum engine speed until a load is applied and the output voltage drops below a predetermined threshold. When this occurs, the system switches back to the voltage feedback method of control.

The current requirements of some loads, such as certain motors, are sometimes dependent on or influenced by the supply frequency. When the system herein described is used with such loads, it is possible that a stable or equilibrium state will be unattainable. In particular, with such a load it is possible that the output voltage will necessitate a change in the engine speed and the divisor N. This change, however, can change the frequency of the supply to the load and, consequently, the current then required by the load. If the output voltage at this newly required current is not correct, a new engine speed and divisor N might be required thereby necessitating still another change in the engine speed and divisor N. Such a cycle might repeat indefinitely as the engine speed changes or "hunts" for an equilibrium state.

To minimize or eliminate the possibility of such an occurrence, the permissible range of output frequencies can be increased somewhat (e.g., from 55 to 65 Hertz). Such an increase in the permissible frequency range not only totally eliminates impermissible speed bands but creates an overlapping speed range to provide a significant hysterisis overlap that minimizes or eliminates the possibility of such "hunting."

The control circuitry 16 of the engine-driven generator is preferably implemented in the form of a suitably programmed, microprocessor-based system. The use of a microprocessor based control circuit provides considerable design flexibility and permits the engine-driven generator to be particularly tailored for specific applications and tasks. Although specific voltages, currents, frequencies and engine operating speeds have been described for purposes of example, it will be appreciated that the system operating parameters can be selected to meet particular application and design criteria. Of course, in selecting particular engine and alternator combinations, consideration should be given to ensuring that the engine will be able to turn the alternator at all engine speeds and conditions of alternator load.

Figure 11:
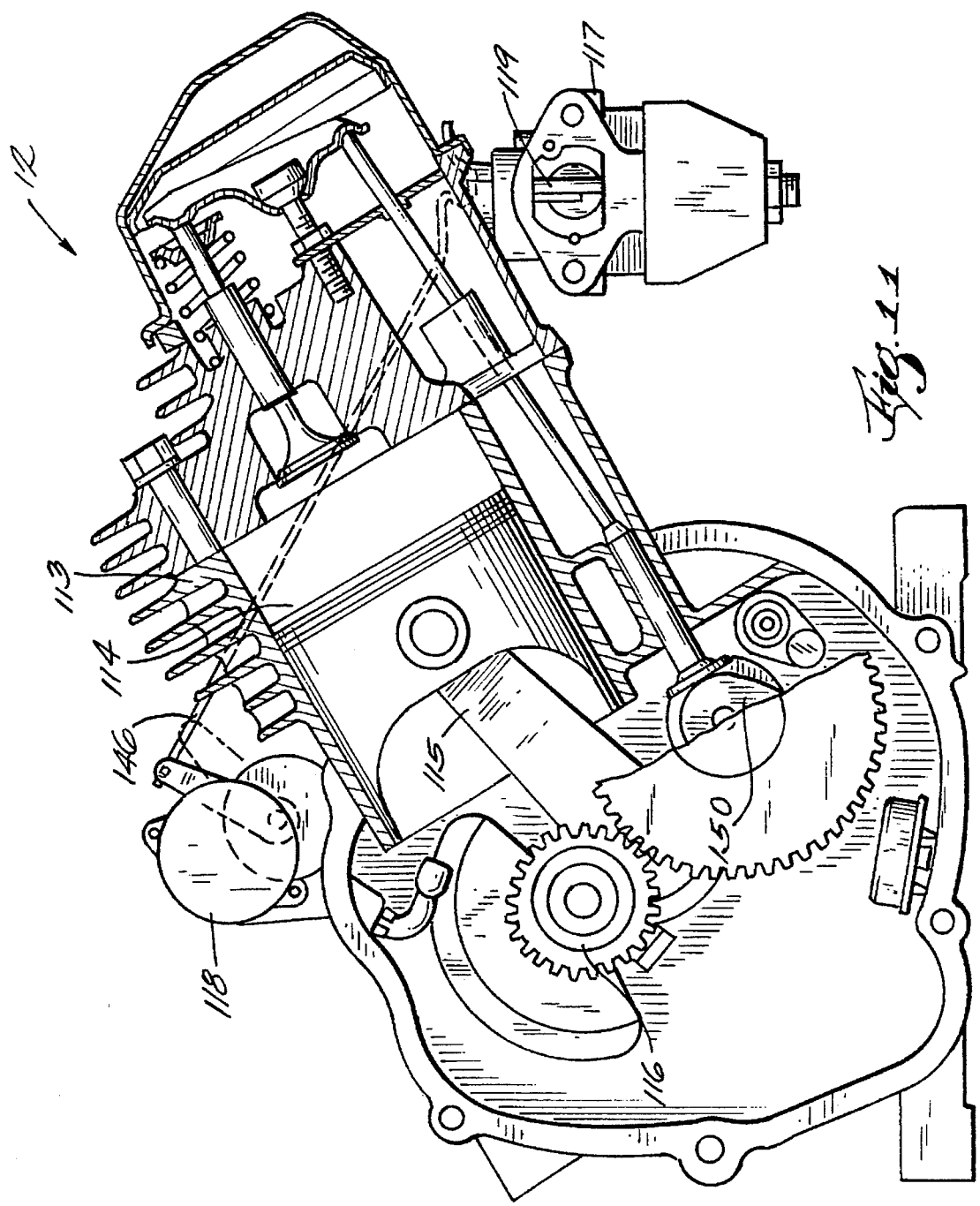
FIG. 11 is a cross sectional view of an internal combustion engine useful in an engine-driven generator constructed in accordance with various aspects of the invention.

An internal combustion engine 12, useful for powering the engine-driven generator is shown in FIG. 11. The internal combustion engine 12 comprises a four cycle, gasoline fueled, carbureted engine having one or move cylinders 113. Each cylinder 113 includes a reciprocable piston 114 connected through a connecting rod 115 to a crankshaft 116. Each cylinder 113 further includes an intake valve for admiring a fuel-air mixture and an exhaust valve for venting exhaust gases following combustion. The intake and exhaust valves are actuated by means of camshaft 150 that is rotated by means of a geared connection to the crankshaft 116. The fuel-air mixture is provided by a carburetor 117 that includes a movable throttle 119. The position of the throttle 119 regulates the amount of fuel and air admitted into the cylinders 113 and thus the speed and power developed by the engine 12.

The internal combustion engine 12 includes a stepper motor throttle actuator 118 that functions to adjust the engine speed and power in accordance with electronic commands provided by an electronic control and regulator circuit that is included in the power generating unit with which the engine is used. Referring to FIG. 12, the throttle actuator assembly 118 includes a stepper motor 120 of known construction having a shaft and a pinion gear 122 mounted on the shaft. The stepper motor 120 is mounted onto a mounting bracket 124 that is adapted to be bolted onto the internal combustion engine 12. The pinion 122 extends through an apeme 126 in the mounting bracket 124 and engages a cam 128 that generally comprises a circular member having a toothed outer circumference 130 and a cam lobe or surface 132 formed on its rear face. The cam 128 is mounted for rotation around a cylindrical boss 134 formed in a cam housing 136 that, in turn, is adapted to be bolted onto the mounting bracket 124 to form a sealed enclosure for the cam 128. A gasket 138 between the cam housing 136 and the mounting bracket 124 helps ensure a tight seal for the cam housing 136. A cam follower 140 is mounted for pivoting movement within the cam housing 136 and is positioned so as to engage and bear against the cam surface 132. A portion 142 of the cam follower 140 projects outwardly through an aperture formed in the cam housing 136 and keys into one end of a lever arm 144, the opposite end of which is coupled through a control rod 146 to the engine throttle 119.

In operation, the stepper motor pinion 122 engages the teeth on the outer rim of the cam 128 so that the rotational position of the cam 128 changes as the motor 120 rotates. As the rotational position of the cam 128 changes under the influence of the motor 120, so too does the rotational position of the cam follower 140 that bears against the cam surface 132. Rotational movement of the cam follower 140), in ram, changes the angular position of the lever arm 144. Movement of the lever ann 140), in turn, is transmitted through the control rod 146 to change the relative position of the throttle 119 and thereby control the engine speed and power.

The cam surface 132 is shaped to that there is a substantially linear relationship between the angular position of the stepper motor 120) and the resulting engine speed and power. In other words, the cam surface 132 is shaped so that, for example, a single rotation of the stepper motor shaft changes the engine 12 speed and power by a fixed amount regardless of whether the engine is operating at a high, low or mid-range speed. Shaping the cam surface 132 in such a manner is necessary because the effect of a given change in throttle position on the engine speed and power varies widely according to the operating speed of the engine 12. For example, a one degree change in the angular position of the throttle will have a much greater effect on engine power when the engine is near idle than it will when the engine is operating at or near its maximum speed and power.

Although the precise shape of the cam surface 132 depends on the characteristics of a particular engine and is best determined through test and experiment, in general the cam is shaped so that when the throttle is nearly closed, there is relatively little movement of the lever arm 144 in response to each rotation of the stepper motor pinion 122, while when the throttle is nearly open, there is greater movement of the lever ann 144 with each rotation of the stepper motor pinion 122. Once again, the goal is to obtain a substantially linear relationship between changes in the stepper motor position and changes in the engine speed and power. This permits the control and regulator circuit 16 to specify a desired, substantially predetermined change in engine speed and power merely by advancing or retarding the stepper motor 120 by a given number of steps, regardless of the absolute position of the stepper motor 120 and regardless of whether the engine 12 is operating a high.. low or mid-range speed. In this manner, the throttle actuator provides precise speed control over substantially the entire range of engine speeds.

Figure 14:
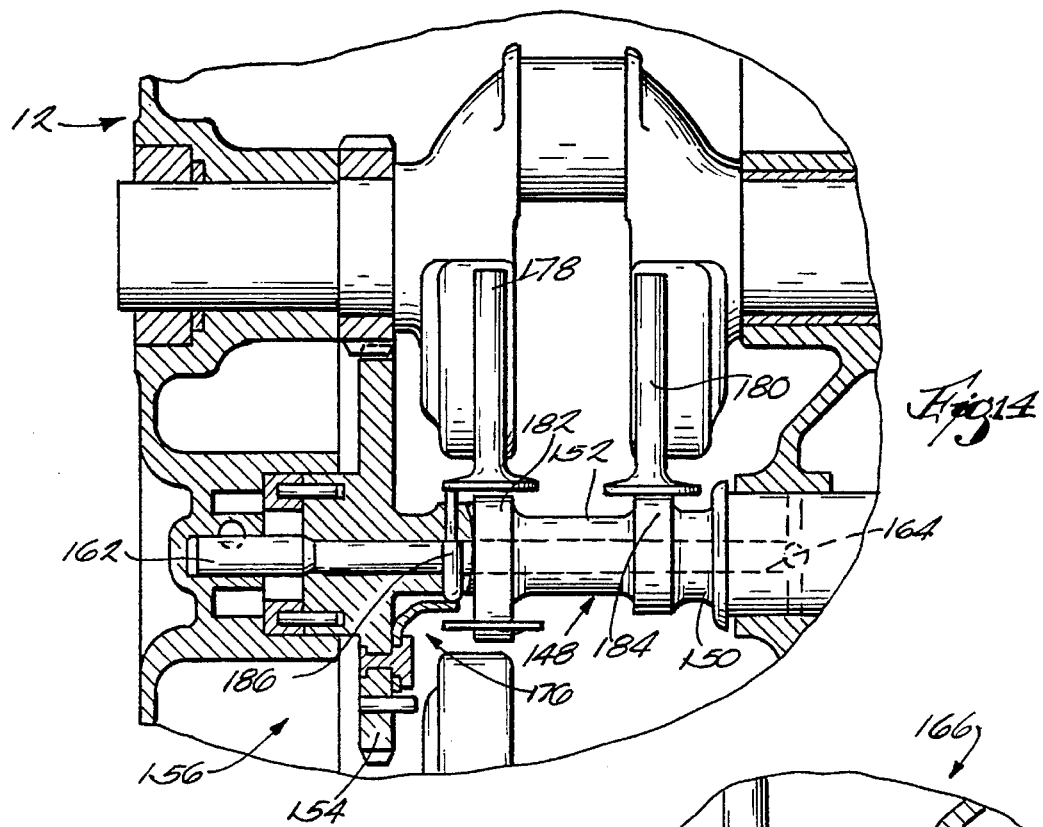
FIG. 14 is a fragmentary cross sectional view of the internal combustion engine showing a camshaft assembly having an integral oil pump.
Figure 16:
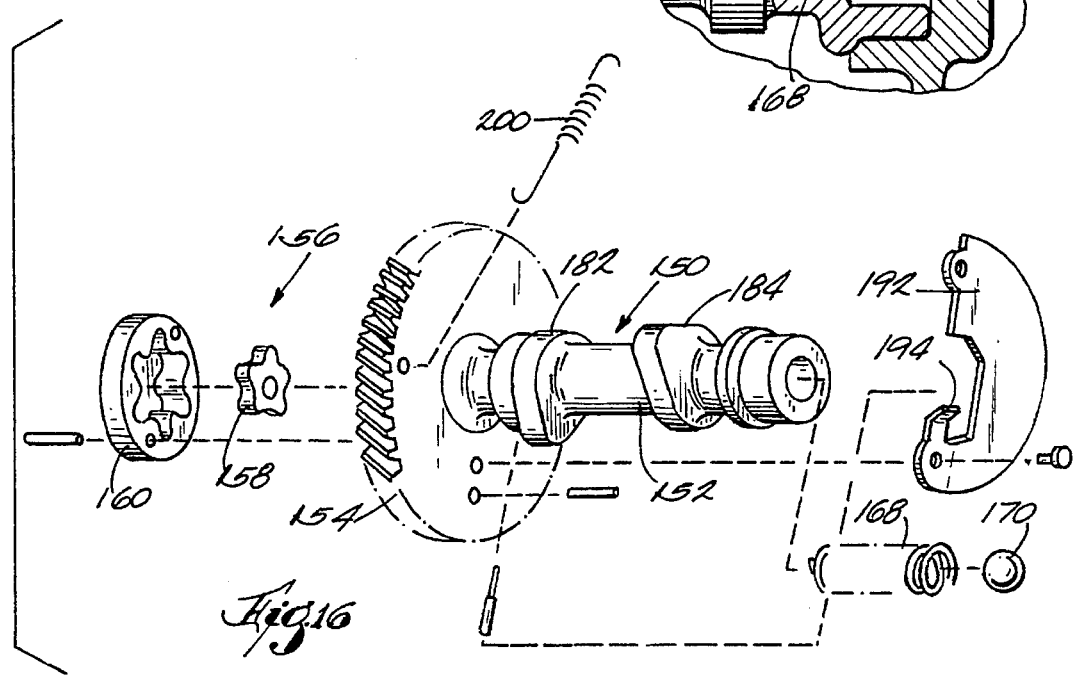
FIG. 16 is an exploded perspective view of the camshaft assembly show in FIG. 14.

The internal combustion engine 12 further includes a camshaft assembly 148 having a camshaft of two piece construction, and still further includes an integral oil pump, a pressure regulating mechanism and an integral compression release mechanism. Referring to FIGS. 14 and 16, the camshaft assembly 148 includes a two piece camshaft 150 having a cam lobe portion 152 and a gear portion 154. Preferably, the cam lobe portion 152 and the gear portion 154 are formed of different materials. For example, the cam lobe portion 152, which is subject to considerable wear, can be machined of hardened iron while the gear portion 154 can be more economically formed of sintered powdered metal or molded plastic. This allows the camshaft 150 to be manufactured more economically than would be the case if the camshaft 150 were machined as a one piece unit. This construction also provides a reduction in camshaft noise.

Figure 15:
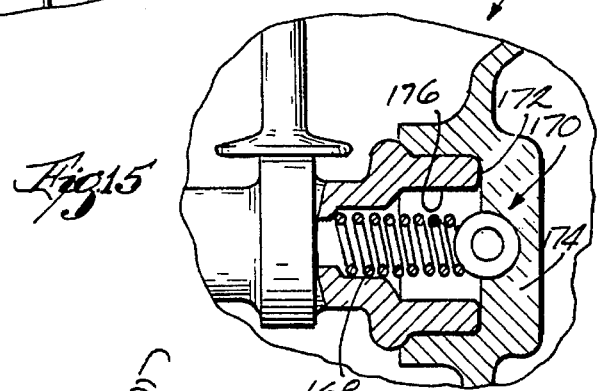
FIG. 15 is an enlarged sectional view of one portion of the camshaft assembly shown in FIG. 14 useful in understanding the construction and operation of an integral oil pressure regulating system included in the engine.

The camshaft assembly further includes an integral oil pump. In the illustrated embodiment, the oil pump 156 comprises inner and outer gerotors 158, 160 of known construction that intermesh and, when rotated relative to each other, operate in known manner as an oil pump. The outer gerotor 160 is pinned onto the outermost face of the camshaft gear 154 so as to be rotatable with the camshaft 150. The inner gerotor 158 is rotatably mounted on a hardened steel shaft 162 that is pinned to the engine housing adjacent the end of the camshaft 150 and within the area bounded by the outer gerotor 160. As the outer gerotor 160 rotates with the camshaft 150, it meshes with the inner gerotor 158 that, in turn, rotates around the shaft 150. Oil pumped through the intermeshing of the inner and outer gerotors 158, 160 is pumped through a bore 164 extending axially through the camshaft 150 to a pressure regulating mechanism 166 best seen in FIG. 15.

The pressure regulating mechanism 166 functions to keep the oil pressure supplied by the inner and outer gerotors 158, 160 within pre-established limits and includes a spring 168 and ball 170 located at the end 172 of the camshaft 150 opposite the inner and outer gerotors 158, 160. The ball 170 is located substantially concentrically with the longimndinal axis of the camshaft 150 and bears against the engine housing 174. The spring 168 is positioned between the ball 170 and the end 172 ofthe camshaft 150 so as to bias the camshaft 150 in the direction toward the inner and outer gerotors 158, 160. Preferably, a recess 176 is formed in the end 172 of the camshaft 150 to form a seat for the spring 168. A gap is provided between the extreme end of the camshaft 150 and the engine housing 174 so that the camshaft 150 can move axially against the bias provided by the spring 168.

In operation, the rotating camshaft 150 is biased toward the inner and outer gerotors 158, 160 by means of the spring 168. The oil pressure developed by the inner and outer gerotors 158, 160, however, biases the camshaft 150 toward the ball 170 thereby compressing the spring 168. As the camshaft 150 moves toward the ball 170, the outer gerotor 160 (which is attached to the camshaft 150) moves axially away from the inner gerotor 158 thereby opening a gap between the outer gerotor face and the radial face of the pump cavity. This has the effect of causing the pump to recirculate oil within the gap thereby reducing the volume of oil pumped by the inner and outer gerotors 158, 160. This has the further effect of reducing the effective oil pressure. The camshaft 150 thus assumes a radial position that balances the axial force developed by the oil pressure against the axial force developed by the spring 168. This maintains the desired oil pressure. If the oil pressure drops, the spring 168 biases the camshaft 150 to close the axial gap. This increases the oil output and raises the oil pressure. Conversely, if the oil pressure increases, the increased pressure presses the camshaft 150 toward the ball 170 against the force of the spring 168. This increases the radial gap resulting in oil recirculation, thereby reducing the oil output and reducing the oil pressure.

One advantage of the pressure regulating mechanism is that the contact point between the ball 170 and the engine housing 174 remains at substantially zero velocity as the camshaft 150 rotates. This minimizes wear and is a distinct advantage over prior spring, ball and ball seat type pressure regulating arrangements wherein wear between the ball and the seat is a significant problem. An additional advantage is that the bias provided by the spring 168 eliminates end-play noise in the camshaft 150 thereby providing quieter operation. It will be appreciated, of course, that a conventional spring, ball and ball seat type of pressure regulator can be used in place of the arrangement herein shown and described.

Figure 17:
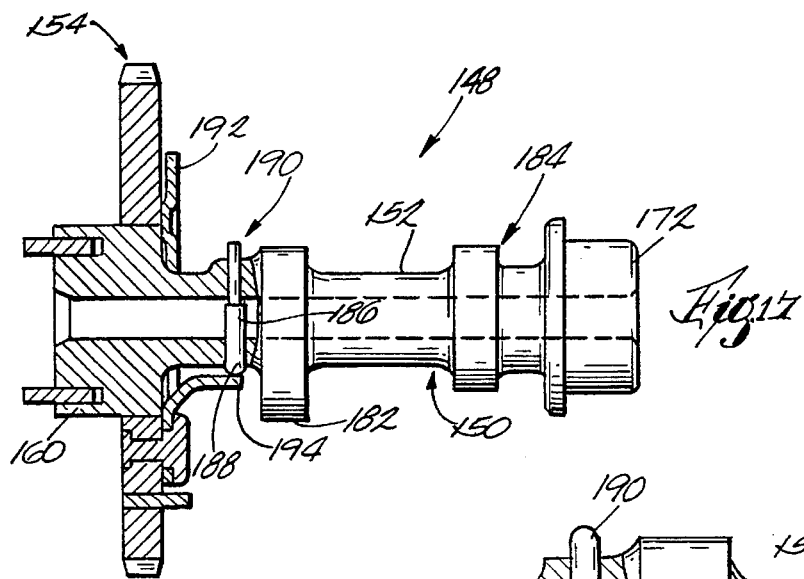
FIG. 17 is a fragmentary cross sectional view of the camshaft assembly useful in understanding the construction and operation of a compression release system included in the engine.
Figure 18:
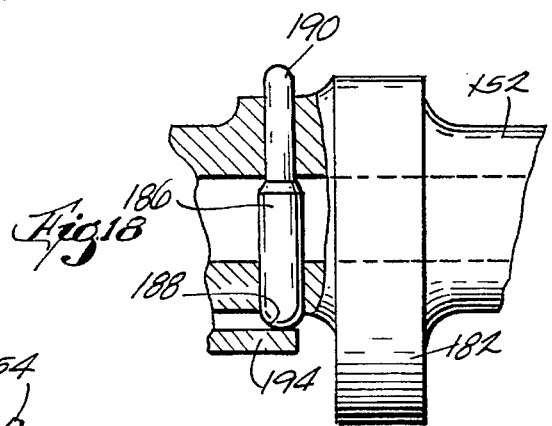
FIG. 18 is an enlarged, fragmentary sectional view of a portion of the camshaft assembly shown in FIG. 17.
Figure 19:
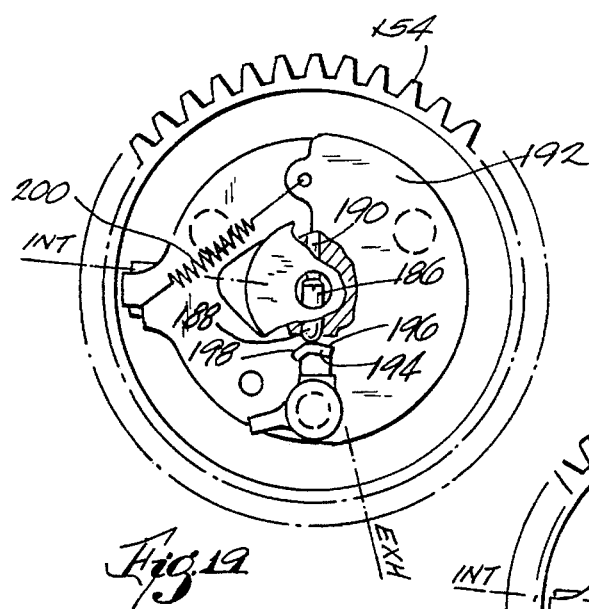
FIG. 19 is an end view of the camshaft assembly shown in FIG. 16 useful in understanding the operation of the compression release system at low engine speeds.

The camshaft assembly 148 further includes an automatic compression release system 176 that reduces engine compression at low engine speeds to reduce cranking torque and thereby make it easier to start the engine 12. Referring to FIGS. 14, 17 and 19, the engine 12 is provided with valve lifters 178, 180 that engage the cam lobes 182, 184 formed on the camshaft 150 and control the opening and closing of the intake and exhaust valves in accordance with the position of the camshaft 150. In the illustrated embodiment, the exhaust valve is actuated by means of the valve lifter 178 that engages the cam lobe 182 nearest the camshaft gear 154. Movement of the valve lifter 178 in the upward direction as shown in FIG. 14 opens the exhaust valve while the exhaust valve closes as the valve lifter 178 moves in the downward direction. A pin 186 extends diametrically through the camshaft adjacent the cam lobe 182 that actuates the exhaust valve lifter 178. The pin 186 is axially movable relative to the camshaft 150 and is oriented so that it is aligned with the exhaust valve lifter 178 as the piston approaches top dead center on the compression stroke.

The length of the pin 186 is such that, when the piston is near top dead center and the lower end 188 of the pin 186 is held almost flush with the outer surface of the camshaft 150, the opposite or upper end 150 projects sufficiently far above the adjacent cam lobe 182 as to slightly open the exhaust valve. If the lower end 188 of the pin 186 is not held flush and is allowed to protrude substantially beyond the outer surface of the camshaft 150, the opposite or upper end 190 does not extend above the level of the adjacent cam lobe 182 and the exhaust valve is not opened. Accordingly, by controlling the axial position of the pin 186 relative to the camshaft 150, the exhaust valve can be made to open slightly or not open as the piston approaches top dead center on the compression stroke.

In the illustrated embodiment, the axial position of the pin 186 is controlled by means of a centrifugal cam mechanism. The cam mechanism includes a cam weight 192 that is pivotally mounted at one end to the camshaft gear 154 and that includes a ramped cam surface 194 that engages the lower end 188 of the pin 186. The ramped cam surface 194 includes on segment or portion 196 that, when positioned opposite the pin, displaces the pin 186 axially so that its opposite end 190 protrudes above the level of the adjacent cam lobe surface 182. The ramped cam surface 194 also includes an additional portion 198 that, when positioned opposite the end of the pin 186, allows the pin to retract axially so that its opposite end 190 does not protrude above the level of the adjacent cam lob surface 182. The cam weight 192 is shaped so that its mass is asynunetrically disposed around the axis of the camshaft 150. Accordingly, as the camshaft 150 rotates, the cam weight 192 tends to pivot outwardly under the influence of centrifugal force. A spring 200 having one end connected to the gear 154 and another end connected to the cam weight 192 biases the cam weight 192 inwardly toward the camshaft 150.

Figure 20:
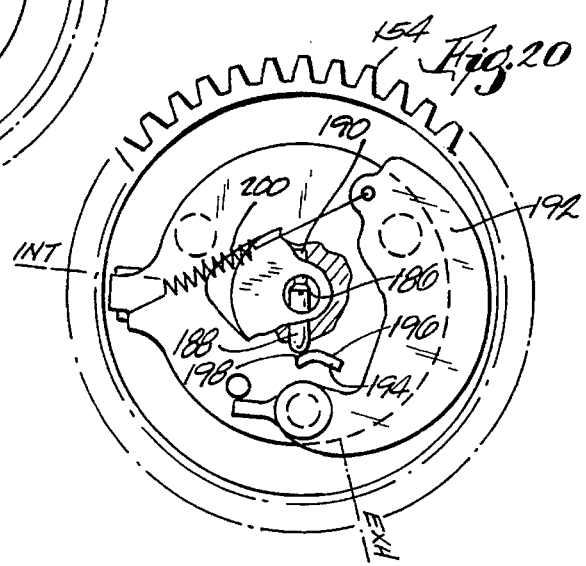
FIG. 20 is an end view of the camshaft assembly shown in FIG. 19 useful in understanding the operation of the compression release system at high engine speeds.

The operation of the automatic compression release and, more particularly, the centrifugal cam mechanism, can best be understood by reference to FIGS. 19 and 20. In FIG. 19, the engine is operating at a very low speed such as, for example, during cranking and starting. Because the centrifugal force on the cam weight 192 is minimal, the spring 200 is able to bias the cam weight 192 inwardly to the position shown. This has the effect of placing the first cam segment 196 under the pin 186, which has the effect of driving the opposite end 190 of the pin above 186 the level of the adjacent cam lobe 182. Because the pin 186 now protrudes above the level of the adjacent cam lobe 182, it has the effect of partially opening the exhaust valve as the piston approaches top dead center. This, in ram, has the effect of reducing (but not totally relieving) the compression developed in the cylinder, which, in ram, has the further effect of reducing the cranking torque. After the engine starts and gathers speed, the cam weight 192 flies outwardly against the tension of the spring 200. This has the effect of bringing the second portion 198 of the ramped cam surface 194 under the pin 186. The pin, being weight biased, will retract thereby placing the opposite end 190 of the pin 186 below the level of the adjacent cam lobe 182. With the pin 186 in this position, the exhaust valve is not opened and the engine develops maximum compression. When the engine is stopped, the centrifugal weight 192 returns to the position shown in FIG. 19.

The engine-driven generator 10 herein shown and described provides numerous advantageous. Because the permanent magnet alternator 14 can be operated at up to its maximum power output point, a smaller and lighter alternator 14 can be used to achieve a given power level that in prior designs wherein the alternators had considerable unused, excess capacity. The use of a smaller alternator 14 reduces the physical size and weight of the generator 10 and significantly reduces manufacturing costs. Furthermore, because it is no longer necessary to operate the internal combustion engine 12 at a constant fixed speed, greater fuel economy is realized and less noise is produced while the generator is in operation and use. Finally, engine life is increased by reason of the slower operating speeds at smaller loads.

Similarly, the engine herein shown and described provides many advantages that make it suitable for use in engine-driven power generating equipment. The use of dissimilar materials for the cam lobe and gear positions of the camshaft reduces engine noise and permits manufacturing economy that reduces the overall cost of the generator. The integral oil pump and oil pressure regulating mechanism are simpler, and use less material than in prior designs thereby reducing engine weight, size and cost. This is important in portable power generating equipment wherein excess size and weight are detrimental to portability. The elimination of wear in the vicinity of the valve regulator ball improves reliability and reduces maintenance, and the elimination of end-play in the camshaft results in an engine that is quieter than in earlier designs. Finally, the automatic compression release mechanism reduces the cranking torque needed to start the engine. This reduces the physical effort needed in hand start models and reduces the power and size of the starter motor needed in electric start models.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An engine-driven generator comprising:

an internal combustion engine including a throttle;

an alternator coupled to said engine and operable to develop a first alternating potential having a frequency and no-load voltage dependent on the speed of said engine;

switching means for converting said first alternating potential into a second alternating potential wherein said second alternating potential is of a lower frequency than said first alternating potential and wherein said second alternating potential comprises a predetermined number of positive polarity half cycles of said first alternating potential followed by an equal number of negative polarity half cycles of said first alternating potential;

frequency regulating means for increasing or decreasing said predetermined number in accordance with the frequency of said first alternating potential so as to maintain the frequency of said second alternating potential between pre-established upper and lower frequency limits; and speed regulating means for operating said internal combustion engine at a desired speed, said speed regulating means comprising:

a stepper motor coupled to said throttle of said internal combustion engine for controlling the position of said throttle; and feedback means responsive to the voltage of said second alternating potential for generating and applying to said stepper motor a control signal operable to actuate said stepper motor to move said throttle and thereby change the speed of said internal combustion engine so as to maintain the voltage of said second alternating potential within a pre-established voltage range.

2. An engine-driven generator as defined in claim 1 wherein said predetermined number of said positive and negative polarity half-cycles is an integer.

3. An engine-driven generator as defined in claim 2 wherein said switching means includes electronic power switching devices.

4. An engine-driven generator as defined in claim 4 wherein said electronic power switching devices are triacs.

5. An engine-driven generator as defined in claim 1 wherein said feedback means further includes means for maintaining the speed of said internal combustion engine between pre-established upper and lower speed limits regardless of the voltage of said second alternating potential.

6. An engine-driven generator as defined in claim 1 further comprising means for deleting from said second alternating potential selected ones of said positive polarity and said negative polarity half-cycles during acceleration of said internal combustion engine so as to reduce the torque required to accelerate said alternator.

7. An engine-driven generator as defined in claim 6 wherein the number of said positive polarity and said negative polarity half pulses deleted from said second alternating potential increases at increased engine speeds.

8. An engine-driven generator comprising:

an internal combustion engine including a throttle;

an alternator coupled to said engine operable to develop a first alternating potential having a frequency and no-load voltage dependent on the speed of said engine;

converter means for converting said first alternating potential to a second alternating potential of a lower frequency than said first alternating potential;

a stepper motor having an output shaft rotatable to predetermined angular positions in accordance with externally applied input commands;

a cam operatively coupled to said output shaft of said stepper motor; and a cam follower engaging said cam and coupled to the throttle of said engine so that movement of said cam in response to movement of said output shaft results in movement of the throttle to vary engine speed.

9. An engine-driven generator as defined in claim 8 wherein said cam is shaped so that the ratio of change in engine power to change in angular position of said output shaft is substantially constant.

10. An engine-driven generator as defined in claim 8 wherein said externally applied input commands are developed by an electronic system control.

11. An engine-driven generator as defined in claim 10 wherein said electronic system control senses the voltage of said second alternating potential and generates an input command to open said throttle and thereby increase the speed of said internal combustion engine when said voltage is less than a predetermined reference and wherein said electronic control system generates an input command to close said throttle and thereby reduce the speed of said internal combustion engine when said voltage exceeds said predetermined reference.

12. An engine-driven generator as defined in claim 11 wherein said electronic control circuit further includes means for maintaining the speed of said internal combustion engine within predetermined maximum and minimum speed limits regardless of the voltage of said second alternating potential.

13. An engine-driven generator as defined in claim 12 wherein said electronic control circuit comprises a microprocessor-based circuit.

14. An engine-driven generator comprising:

an internal combustion engine of the type having a movable throttle for changing engine power and speed, wherein the relationship between the change in engine power and speed and the change in throttle position is non-linear;

an alternator coupled to said engine operable to develop a first alternating potential having a frequency and no-load voltage dependent on the speed of said engine;

converter means for converting said first alternating potential into a second alternating potential of lower frequency than said first alternating potential;

a stepper motor responsive to an applied input cormnand and having an output shaft, the angular position of said output shaft being determined by the applied input command;

a cam coupled to said output shaft of said stepper motor for angular movement so that the angular position of said cam changes in direct proportion to changes in the angular position of said output shaft; and a cam follower engaging said cam and coupled to said throttle so that a change in the angular position of said cam results in movement of the throttle to effect a change in the engine speed and power;

said cam being shaped so that the relationship between the change in the angular position of said cam and the change in the position of the throttle is non-linear and substantially compensates for the non-linear relationship between throttle position and engine speed and power so as to provide a predetermined relationship between changes in the angular position of said stepper motor output shaft and the resulting changes in engine speed and power.

15. An engine-driven generator as defined in claim 14 wherein said predetermined relationship comprises a substantially linear relationship between changes in the angular position of said stepper motor output shaft and said resulting changes in engine speed and power.

* * * * *